US012746107B2

(12) United States Patent
Werdelin et al.

(10) Patent No.: US 12,746,107 B2
(45) Date of Patent: Sep. 29, 2026

(54) APPARATUS AND METHOD FOR ANIMAL DENTAL CLEANING

(71) Applicant: BARKBOX, INC., New York, NY (US)

(72) Inventors: Henrik Werdelin, New York, NY (US); Vivien Heo, New York, NY (US); Melissa Seligmann, New York, NY (US); Mikkel Jensen, New York, NY (US)

(73) Assignee: BARKBOX, INC., New York, NY (US)

(*) Notice: Subject to any disclaimer, the term of this patent is extended or adjusted under 35 U.S.C. 154(b) by 289 days.

(21) Appl. No.: 17/484,584

(22) Filed: Sep. 24, 2021

(65) Prior Publication Data

US 2022/0087804 A1 Mar. 24, 2022

Related U.S. Application Data

(60) Provisional application No. 63/082,581, filed on Sep. 24, 2020.

(51) Int. Cl.

*A61D 5/00* (2006.01)
*A23K 50/40* (2016.01)
*A61D 7/00* (2006.01)

(52) U.S. Cl.

CPC ................ *A61D 5/00* (2013.01); *A23K 50/40* (2016.05); *A61D 7/00* (2013.01)

(58) Field of Classification Search

CPC . A61D 5/00; A61D 7/00; A23K 50/40; A23K 20/00; A23K 40/00; A23K 40/20; A23K 40/25; A23K 10/20; A23K 10/25; A01K 15/026

See application file for complete search history.

(56) References Cited

U.S. PATENT DOCUMENTS 7,032,541 B1 4/2006 Tsengas
7,506,614 B1 3/2009 Tsengas (Continued)

FOREIGN PATENT DOCUMENTS

CN 211241280 U 8/2020
WO 2012002966 1/2012
WO 2019071336 4/2019

OTHER PUBLICATIONS

International Preliminary Report On Patentability Issued in Corresponding Application No. PCT/US2021/051984 Dated Aug. 2, 2022.

(Continued)

*Primary Examiner* — Nikki H. Dees
*Assistant Examiner* — Stephanie R Gerla
(74) *Attorney, Agent, or Firm* — Grogan, Tuccillo & Vanderleeden, LLP

(57) ABSTRACT

An edible chew for oral delivery of a substance includes a body portion having a plurality of protrusions and an open channel extending longitudinally along the body portion, the channel configured to receive the substance for oral delivery. The channel includes a channel opening, having two opposed shoulder portions, and a cavity, the channel opening, shoulder portions and cavity being configured to inhibit removal of the substance by the animal without ingestion of the edible chew.

14 Claims, 2 Drawing Sheets

(56) References Cited

U.S. PATENT DOCUMENTS

| | | | | |
|---|---|---|---|---|
| 2009/0142281 | A1* | 6/2009 | Rand | A23L 3/3571 252/186.1 |
| 2011/0052661 | A1 | 3/2011 | Weiss | |
| 2014/0186276 | A1* | 7/2014 | Mahe | A01K 15/026 426/94 |
| 2018/0243063 | A1 | 8/2018 | Coopersmith et al. | |
| 2019/0059569 | A1 | 2/2019 | Raku | |

OTHER PUBLICATIONS

International Search Report Issued in Corresponding Application No. PCT/US2021/051984 Dated Dec. 28, 2021.
Extended European Search Report for corresponding European. Patent Application No. 21873529.8.
Corresponding Chinese Office Action for China Application No. 2021800652412, dated Nov. 20, 2024.

* cited by examiner

APPARATUS AND METHOD FOR ANIMAL DENTAL CLEANING

CROSS REFERENCE TO RELATED APPLICATION

This application claims the benefit of U.S. Provisional Patent Application Ser. No. 63/082,581, which is hereby incorporated by reference in its entirety.

TECHNICAL FIELD

The present invention relates generally to the field of animal dental products, and, in particular, to an apparatus, system and method for dental cleaning via a dental chew and cleaning agent.

DISCUSSION OF ART

Oral health is an important issue for domesticated animals such as dogs and cats. The diet of such animals, e.g., canned and dried foods, may not include natural teeth cleaning agents that would be found in a traditional diet. As a result, the American Veterinary Dental College estimates that 80% of dogs and 70% of cats over the age of three develop oral disease, i.e., an infection of the teeth, gums, and mouth, which can lead to serious health issues. More specifically, oral disease may start off with bad breath and discolored teeth, but can progress to cessation of eating dried food or chewing toys due to discomfort and pain. If untreated, it can lead to tooth loss and, in some instances, heart disease as bacteria in the mouth pass into the bloodstream and accumulate in pets' arteries.

To clean the teeth, gums, and mouths of pets, veterinarians are often utilized. While effective, professional cleanings can be costly and may require anesthesia. As a result, such cleanings may not occur frequently enough to ensure oral health. Moreover, home treatments with a toothbrush, and potentially toothpaste or gel, may be difficult to accomplish as the pet may not be compliant and the treatment may not be tolerated. Edible 'dental chews' may also be employed. Such chews typically have external features designed to break up plaque and stimulate pets' gums. These chews may not be effective, however, as their external features and/or composition may not provide adequate cleaning, and they do not facilitate the use of a toothpaste.

BRIEF SUMMARY OF THE INVENTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the claims, nor is it intended as an aid in determining the scope of the claimed subject matter. Its sole purpose is to present some concepts of the disclosure in a streamlined form as a prelude to the more detailed description that is presented later.

With this is mind, to solve the above technical problem, embodiments of the invention provide an edible chew configured for effective oral delivery of a substance such as a dental cleaning agent.

In an embodiment, an edible chew for oral delivery of a substance to an animal includes a body portion having a plurality of protrusions configured to interact with the animal's teeth, gums and/or related oral structures. The chew further includes an open channel extending longitudinally along the body portion, the channel configured to receive the substance for oral delivery. The channel includes two opposed shoulder portions and a cavity, the shoulder portions and cavity being configured prevent removal of the substance by the animal without ingestion of the edible chew.

In another embodiment, a system for oral delivery of a dental cleaning composition includes an edible chew having a body portion featuring a plurality of protrusions. The chew further including an open channel extending longitudinally along the body portion, the channel configured to receive the dental cleaning composition, the channel including a channel opening, having two opposed shoulder portions, and a cavity, the channel opening, shoulder portions and cavity being configured prevent removal of the dental cleaning composition by the animal without ingestion of the edible chew. The system further includes a dental cleaning composition, doses of which may be placed within the open channel of the chew for oral delivery.

In yet another embodiment, a method of orally delivering a dental cleaning composition to an animal includes placing a dose of dental cleaning composition within an open channel of an edible chew, the open channel extending longitudinally along a body portion of the edible chew and including a channel opening, having two opposed shoulder portions, and a cavity, the channel opening, shoulder portions and cavity being configured prevent removal of the dental cleaning composition by the animal without ingestion of the edible chew. The method further includes providing the edible chew with dental cleaning composition to an animal for consumption.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any embodiment described herein as "exemplary" or "illustrative" is not necessarily to be construed as preferred or advantageous over other embodiments. All of the embodiments described below are exemplary embodiments provided to enable persons skilled in the art to make or use the embodiments of the disclosure and are not intended to limit the scope of the disclosure, which is defined by the claims.

It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Referring generally to FIGS. 1-4B, embodiments of the present invention include an edible chew 10, which has an open interior or channel 44 that is configured to receive a dental cleaning agent 30, e.g., toothpaste or tooth gel, a dose of which may be distributed to the channel 44 via a compressible tube 20 or other vessel. Once the dose has been placed within the channel 44, the chew 10 is provided to an animal for oral delivery of the cleaning agent 30.

Figure 1:
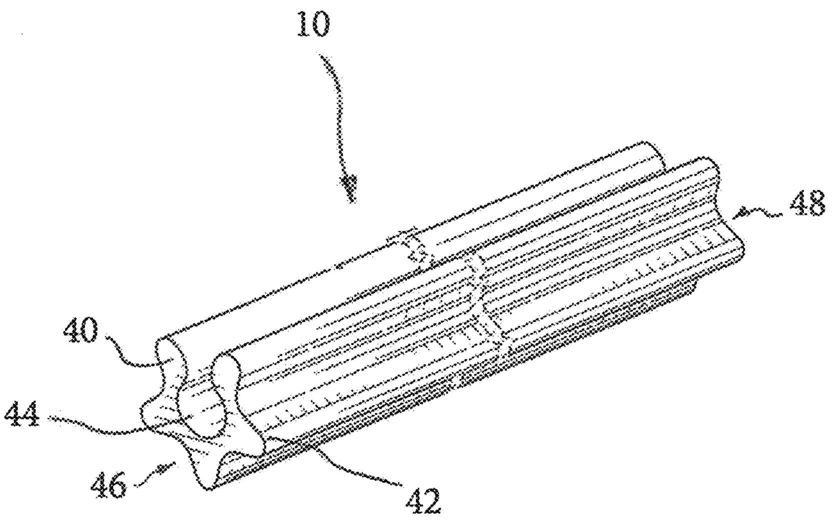
FIG. 1 is a perspective view of an edible chew, shown broken away and bracketed to indicate the chew can be of various lengths, according to an embodiment of the invention.
Figure 2:
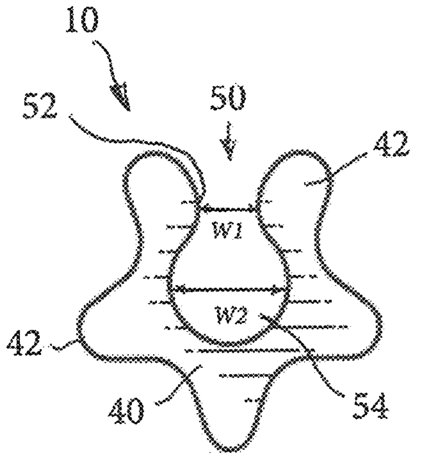
FIG. 2 is an end view of the edible chew of FIG. 1.
Figure 3:
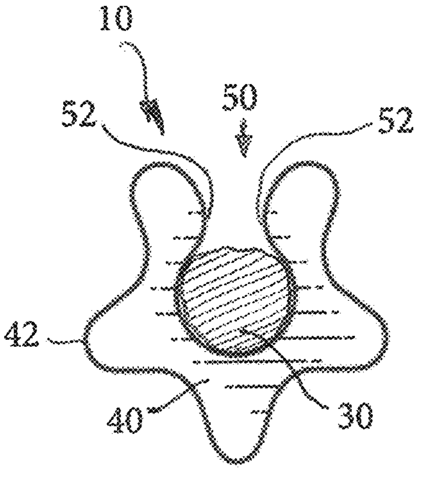
FIG. 3 is an additional end view of the edible chew of FIG. 1.

Turning now to FIGS. 1-3, embodiments of the edible chew 10 have a body portion 40 that has an elongated shape or profile and includes a plurality of protrusions 42 that extend longitudinally along the length of the chew 10. The protrusions 42 may extend from one distal end 46 of the chew 10 to an opposite distal end 48. While the protrusions 42 are shown as rounded or domed in shape, they may have other shapes, provided they effectively engage with the teeth, gums, and/or related structures within an animal's mouth.

As shown, the plurality of protrusions may include five longitudinally extending ribs 42. The ribs 42 are evenly spaced about the body portion 40 of the edible chew 10. As will be appreciated, greater or less than five ribs may be employed in various other embodiments.

Referring again to FIGS. 1-3, the body portion 40 also features an open channel 44. The channel 44 extends longitudinally along and into the body portion 40 from distal end to distal end of the chew 10. In embodiments, the channel 44 may open on a top surface of the chew 10 as well as on one or both distal ends 46, 48 of the chew 10.

As shown, the channel 44 includes a channel opening 50, having two opposed shoulder portions 52. The shoulder portions 52 may be formed as part of one or more (e.g., two) of the longitudinal protrusions 42, or may be internal to the channel 44 and not protrude from the body portion 40. The shoulder portions 52 extend inward to create a narrowed neck that opens or transitions into cavity 54 of the channel 44. The channel opening 50 is sized to allow an applicator tip of a cleaning agent vessel to extend into the channel 44 and deliver a dose of the cleaning agent into the cavity 54.

The shoulder portions 52 define the width of the channel opening 50. This width, W1, is less than the width, W2, of the cavity 54. In particular, the width of the channel opening 50 at its widest point in the channel 44 is less than the width of the cavity 54, at its widest point in the channel 44. In embodiments, the width of the cavity 54 may be about 1.5 to about 2 times the width of the channel opening 50.

The shoulder portions 52 extend into the channel 50 to inhibit, i.e., limit or substantially prevent, an animal from removing the cleaning agent or other substance from the chew 10, without first chewing/ingesting the chew 10. As will be appreciated, animals may wish to simply lick the cleaning agent off the chew 10 thereby preventing the beneficial synergistic effect of using the chew 10 as a toothbrush to distribute the cleaning agent throughout the animal's mouth. The shoulder portions 52 inhibit this from happening, increasing the efficacy of the chew 10. This aspect is important, as the combination of the chew 10 and cleaning agent 30 provides effective dental cleaning.

Referring to FIG. 3, once a dose of the cleaning agent 30 is placed within the cavity 54, a majority of the surface area of the dose 30 is surrounded by the body portion 40. That is, a majority of the surface area of the dose 30 is not exposed through the channel opening 50 and thus not available for extraction via licking.

The cavity 54 may be sized to hold a specific dose of cleaning agent. In embodiments, the cavity is configured to hold a 2 ml dose of enzyme containing toothpaste or tooth gel. The cavity 54, and chew 10, may varying in size depending on the size of the animal receiving the cleaning agent or other substance and/or the size of the dose to be orally administered. In embodiments, the chew may be offered in small, medium and large sizes depending on height, weight, and/or type of animal.

The cavity 54 may also have a variety of shapes. While it is depicted having a rounded, annular cross-sectional shape, this shape may vary. For example, the cavity 54 may be squared, angled, etc. In certain embodiments, the 54 may come preloaded with the cleaning agent 30 or may be filled with the cleaning agent prior to use.

As mentioned, the chew 10 is edible, i.e., composed of materials capable of ingestion or biodegradation. Such materials may be compressed or solidified. By way of non-limiting examples, materials may include grains or cereals or processed animal byproducts. As will be appreciated, the materials may be tailored to form specific flavors or compositions suitable for different target animal species.

In a specific embodiment, the edible chew 10 includes potato starch, gelatin, pea protein chicken, vegetable glycerin, lecithin, natural smoke flavor, citric acid and mixed tocopherols. As will be appreciated, other formulations with different ingredients may be employed, though a relatively high protein, low fat and low-calorie chew may be desirable.

In embodiments, that edible chew 10 may be manufactured through an extrusion process. In other embodiments, other manufacturing processes may be utilized.

In embodiments, the cleaning agent 30 is an enzymatic toothpaste (or tooth gel) containing a plurality of active enzymes, e.g., amyloglucosidase, glucose oxidase and lactoperoxidase. A combination of enzymes helps break up harmful microbes and clean teeth and supports the healthy anti-microbial processes already happening in an animal's mouth, but with a much greater level of enzyme activity. Though described with three enzymes, other cleaning agents may be employed utilizing other numbers/combinations of enzymes, e.g., two or more enzymes. In certain embodiments, a cleaning agent having single enzyme may be utilized.

In a specific embodiment, the cleaning agent 30 is a tooth paste or gel that includes water, lactose-free skim milk powder, glycerol, sorbitol, chicken powder; microcrystalline cellulose, alginate, citric acid, enzymes (amyloglucosidase, glucose oxidase and lactoperoxidase), potassium sorbate, and carboxymethyl cellulose.

As will be appreciated, in certain embodiments, the edible chew 10 may be used to deliver a substance other than a dental cleaning agent. In this regard, the definition of "substance" is meant to include any composition that is orally administrable to an animal via chew 10. For example, a veterinarian may compound an unappealing active ingredient (pharmaceutical or otherwise) into a gel or paste that includes an appealing flavor, e.g., chicken, pork, or beef, and place the resulting substance into the open channel 44 of the edible chew 10 for effective oral delivery.

Figure 4A:
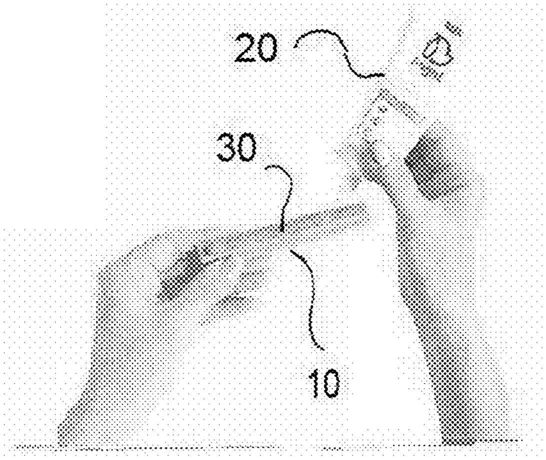
FIG. 4A is an illustration of an edible chew and dental cleaning agent according to an embodiment of the invention.
Figure 4B:
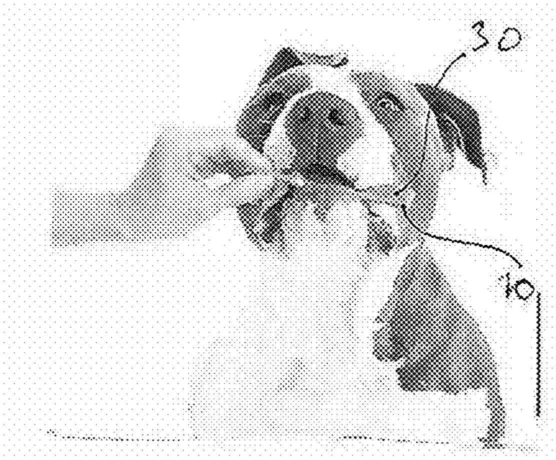
FIG. 4B is an illustration of an oral delivery of a dental cleaning agent via the edible chew of FIG. 4A.

In use, a "cleaning agent," which includes, but is not limited to, conventional toothpastes, tooth gels, and the like, as well as multi-enzymatic toothpastes and gels, is applied to the channel in the chew 10. As shown in FIGS. 4A and 4B, the cleaning agent 30 may be placed within the chew 10, via a compressible tube or like vessel. The chew 10 with cleaning agent 30 is then provided to the dog or other animal. The edible chew, and its starches, scrub at the plaque buildup on the animal's teeth, which exposes more surface area for enzymes in the dog's mouth to work.

It is anticipated that the inventive edible chew 10 will be utilized on a daily basis, though other intervals may be possible.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "an embodiment" or "one embodiment" of the present invention are not intended to be interpreted as excluding the existence of additional embodiments that also incorporate the recited features.

In the appended claims, the terms "including" and "in which" may be used as the plain-English equivalents of the respective terms "comprising" and "wherein." Moreover, in the following claims, terms such as "first," "second," "third," "upper," "lower," "bottom," "top," etc. are merely labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the following clauses

1. An edible chew for oral delivery of a substance comprising: a body portion having a plurality of protrusions; an open channel extending longitudinally along the body portion, the channel configured to receive the substance for oral delivery; and wherein the channel includes a channel opening, having two opposed shoulder portions, and a cavity, the channel opening, shoulder portions and cavity being configured to inhibit removal of the substance by the animal without ingestion of the edible chew.

2. The edible chew of clause 1, wherein the two opposed shoulder portions define a width of the channel opening, the width of the channel opening being less than a width of the cavity.

3. The edible chew of clause 1, wherein a majority of surface area of a dose of the substance may be contained within the channel and not exposed through the channel opening 4. The edible chew of clause 1, wherein the plurality of protrusions includes five longitudinally extending ribs each extending from a first distal end of the chew to a second distal end opposite the first distal end 5. The edible chew of clause 4, wherein two of the ribs also form the shoulder portions of the channel 6. The edible chew of clause 4, wherein the ribs are substantially evenly spaced about the body portion 7. The edible chew of clause 1, wherein the channel is open longitudinally along the body portion as well as on at least one distal end of the chew.

8. The edible chew of clause 1, wherein the channel includes a dose of the substance for oral delivery 9. The edible chew of clause 1, wherein the substance is an enzyme containing toothpaste or tooth gel 10. A system for oral delivery of a dental cleaning agent comprising: an edible chew that includes: a body portion having a plurality of protrusions; an open channel extending longitudinally along the body portion, the channel configured to receive the dental cleaning composition, the channel including a channel opening, having two opposed shoulder portions, and a cavity, the channel opening, shoulder portions and cavity being configured to inhibit removal of the dental cleaning composition by the animal without ingestion of the edible chew; and a dental cleaning agent, doses of which may be placed within the open channel of the chew for oral delivery.

11. The system of clause 10, wherein the dental cleaning agent is an enzyme containing toothpaste or tooth gel.

12. The system of clause 11, wherein the enzyme containing toothpaste or tooth gel includes amyloglucosidase, glucose oxidase and lactoperoxidase 13. The system of clause 10, wherein the two opposed shoulder portions define a width of the channel opening, the width of the channel opening being less than a width of the cavity.

14. The system of clause 10 wherein a majority of surface area of a dose of the cleaning agent may be contained within the channel and not exposed through the channel opening 15. The system of clause 10 wherein two of the protrusions also form the shoulder portions of the channel 16. The system of clause 10 wherein the channel is open longitudinally along the chew as well as on at least one distal end of the chew 17. The system of clause 10 wherein the plurality of protrusions includes five longitudinally extending ribs each extending from a first distal end of the chew to a second distal end opposite the first distal end 18. The system of clause 17 wherein the ribs are substantially evenly spaced about the body portion 19. A method of orally delivering a dental cleaning composition to an animal comprising the steps of: placing a dose of dental cleaning agent within an open channel of an edible chew, the open channel extending longitudinally along a body portion of the edible chew and including a channel opening, having two opposed shoulder portions, and a cavity, the channel opening, shoulder portions and cavity being configured to inhibit removal of the dental cleaning agent by the animal without ingestion of the edible chew; and providing the edible chew with dental cleaning agent to an animal for consumption 20. The method of clause 19 wherein the step of placing the dose includes squeezing the dose from a tube containing the dental cleaning agent 21. The method of clause 20 wherein the dental cleaning agent is an enzyme containing toothpaste or tooth gel 22. The method of clause 21 wherein the toothpaste or tooth gel includes amyloglucosidase, glucose oxidase and lactoperoxidase 23. The method of clause 21 wherein the two opposed shoulder portions define a width of the channel opening, the width of the channel opening being less than a width of the cavity.

What is claimed is:

1. An edible chew for oral delivery of a substance, comprising:

an edible body portion having a plurality of ribs on an exterior of the edible body portion, the plurality of ribs protruding outward from the edible body portion;

a single open channel extending in a substantially longitudinal direction along an entire length of the edible body portion and into the edible body portion, the single open channel being longitudinally open from a first distal end of the edible chew to a second distal end opposite the first distal end, the single open channel configured to receive the substance for oral delivery, such that the substance, when received, is located within the edible body portion, wherein the substance to be received is a gel or paste; and wherein the single open channel comprises:

a channel opening, having two opposed shoulder portions formed as part of one or more ribs of the plurality of ribs and extending in a substantially longitudinal direction in parallel to one another along an entire length of the edible body portion, and a cavity configured to receive the substance, the cavity having a rounded, annular cross-sectional shape, wherein the channel opening, the two opposed shoulder portions, and the cavity are all at least partially open to the exterior of the edible body portion, wherein the two opposed shoulder portions define a width of the channel opening, the width of the channel opening being less than a width of the cavity such that, the two opposed shoulder portions define a constricted entrance to the cavity that predominantly retains the substance within the cavity while partially shielding the substance from access through the channel opening when the substance is deposited in the cavity, thereby substantially inhibiting removal of the substance by the licking of the animal alone without ingestion or chewing, wherein the single open channel extends into the edible body portion between the two opposed shoulder portions, and wherein the plurality of ribs has a space between adjacent ribs that does not extend into the edible body portion.

2. The edible chew of claim 1, wherein when a dose of the substance is contained within the single open channel, a majority of the surface area of the dose of the substance is not externally exposed outside of the channel opening.

3. The edible chew of claim 2, wherein the cavity is configured to hold the dose of the substance of approximately 2 milliliters (ml).

4. The edible chew of claim 1, wherein the plurality of ribs includes five longitudinally extending ribs each extending from the first distal end of the edible chew to the second distal end opposite the first distal end.

5. The edible chew of claim 4, wherein the five longitudinally extending ribs are substantially evenly spaced about a circumference of the edible body portion.

6. The edible chew of claim 1, wherein the single open channel is open longitudinally along the entire length of the edible body portion as well as on the first distal end and the second distal end of the edible body portion.

7. The edible chew of claim 1, wherein the single open channel includes a dose of the substance for oral delivery.

8. The edible chew of claim 1, wherein the substance is at least one of an enzyme containing toothpaste or an enzyme containing tooth gel.

9. A system for oral delivery of a dental cleaning agent comprising:

a dental cleaning agent;

an edible body portion having a plurality of ribs on an exterior of the edible body portion, the plurality of ribs protruding outward from the edible body portion;

a single open channel extending in a substantially longitudinal direction along an entire length of the edible body portion and into the edible body portion, the single open channel configured to receive the dental cleaning agent such that the dental cleaning agent, when received, is located within the edible body portion, wherein the dental cleaning agent includes at least one of an enzyme containing toothpaste and an enzyme containing tooth gel; and wherein the single open channel comprises:

a channel opening, having two opposed shoulder portions formed as part of one or more ribs of the plurality of ribs and extending in a substantially longitudinal direction in parallel to one another along an entire length of the edible body portion, and a cavity, the cavity having a rounded, annular cross-sectional shape, wherein the channel opening, the two opposed shoulder portions, and the cavity are at least partially open to the exterior of the edible body portion, wherein the two opposed shoulder portions define a width of the channel opening, the width of the channel opening being less than a width of the cavity such that, the two opposed shoulder portions define a constricted entrance to the cavity that predominantly retains the substance within the cavity while partially shielding the substance from access through the channel opening when the substance is deposited in the cavity, thereby substantially inhibiting removal of the substance by the licking of the animal alone without ingestion or chewing, wherein the single open channel extends into the edible body portion between two of the plurality of ribs, which also form the two opposed shoulder portions of the single open channel; and wherein the plurality of ribs has a space between adjacent ribs that does not extend into edible body portion.

10. The system of claim 9, wherein the at least one of the enzyme containing toothpaste or the enzyme containing tooth gel includes at least one of amyloglucosidase, glucose oxidase and lactoperoxidase.

11. The system of claim 9, wherein when a dose of the dental cleaning agent is contained within the single open channel, a majority of the surface area of the dose of the substance is not exposed outside of the channel opening.

12. The system of claim 9, wherein the single open channel is open longitudinally along the entire length of the edible body portion as well as on the first distal end and the second distal end of the edible body portion.

13. The system of claim 9, wherein the plurality of ribs includes five longitudinally extending ribs each extending from the first distal end of the edible body portion to the second distal end opposite the first distal end.

14. The system of claim 13, wherein the five longitudinally extending ribs are substantially evenly spaced about a circumference of the edible body portion.

* * * * *